Figure 3:
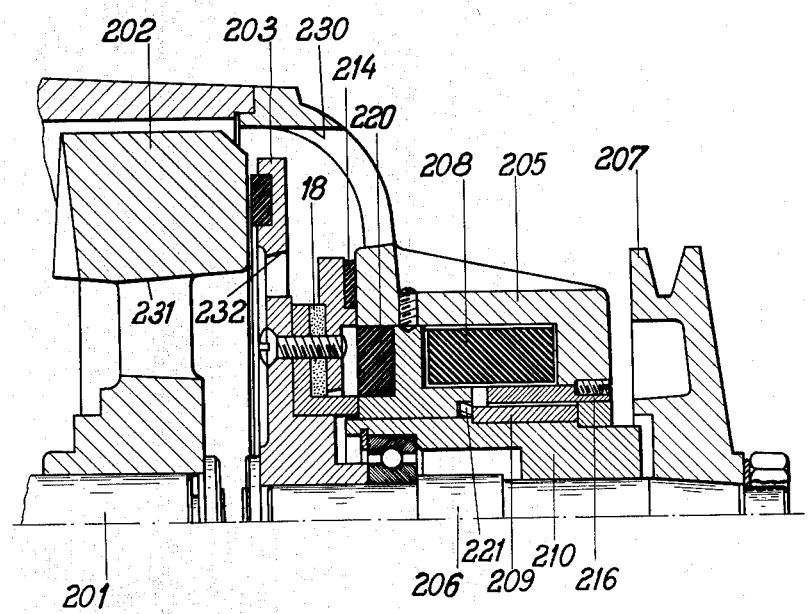

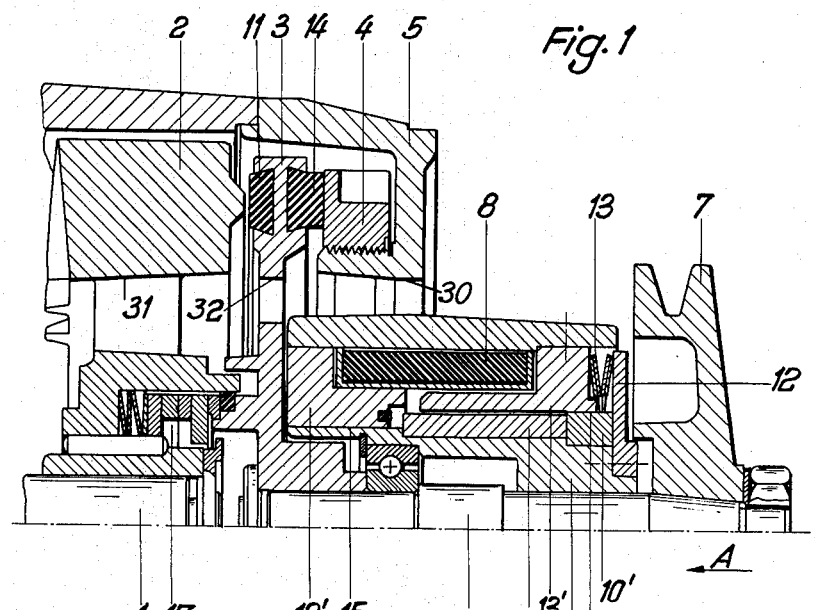
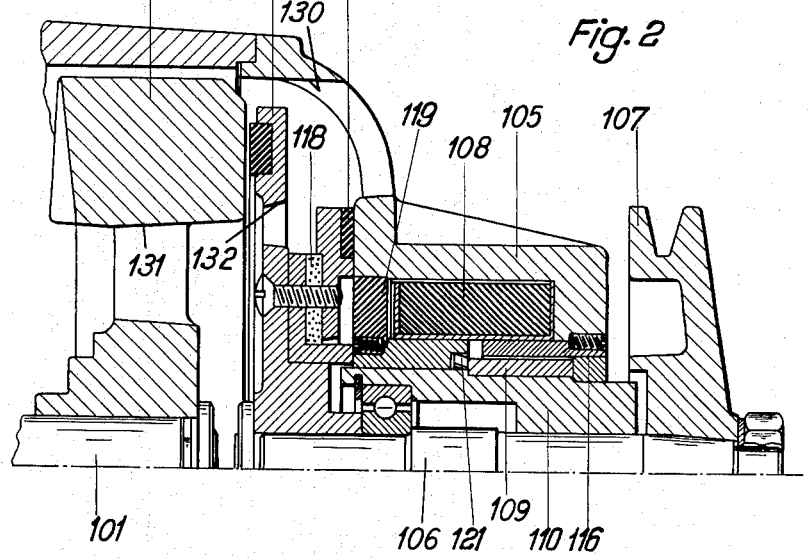

Inventors
ERNST BECKER
GEORG TAEFFNER

United States Patent Office 3,227,253
Patented Jan. 4, 1966

3,227,253
CLUTCH AND BRAKE FOR SEWING MACHINE
Ernst Becker and Georg Taeffner, Darmstadt, Germany, assignors to Firma Quick-Elektromotorenwerk G.m.b.H.
Filed Jan. 19, 1962, Ser. No. 167,255
7 Claims. (Cl. 192—18)

A facility which is necessary in electrically driven sewing machines, especially in sewing machines industrially used, is that the machine should be capable of being instantaneously stopped and started at any time. It is desirable that the sewing needle should rapidly come to a stop and that it should equally rapidly resume normal sewing speed. In order to meet this need, so-called clutch motors have been developed. With the object of keeping the power of such clutch motors as low as is possible, they are associated with an energy storage means capable of supplying the power required for the rapid acceleration of the mainshaft of the sewing machine. This energy storage means is a flywheel which simultaneously functions as one member of a clutch for optionally either connecting a pulley for driving the sewing machine with the flywheel or disconnecting the same from the flywheel. A clutch motor of the aforedescribed kind is also equipped with a brake disc with which the clutch disc, having been disengaged from the flywheel, can be brought into frictional contact for stopping the sewing needle immediately the clutch is disengaged.

Starting and stopping of the sewing machine is accomplished by shifting the clutch disc with the aid of a shift sleeve, usually controlled by the operator of the sewing machine from a foot pedal acting through a rod and lever transmission.

The present invention provides drive means for a sewing machine comprising a flywheel mounted on a driving shaft, a stationary brake disc, a clutch disc mounted on a driven shaft and axially shiftable into frictional contact either with the flywheel or the brake disc, a stationary solenoid having an axially shiftable plunger for shifting said clutch disc, with the solenoid concentrically surrounding the driven shaft is the form of a cylindrical coil and with the plunger being ring-shaped and projecting into the interior of the cylindrical coil.

Preferentially a shiftable sleeve axially shifts the clutch disc interposed between the driven shaft and the plunger.

Conveniently, the solenoid is arranged to shift the clutch disc into contact with the flywheel, when the solenoid coil is energised.

The invention eliminates every kind of rod and lever transmission for shifting the clutch disc wherefor the power loss involved in the use of a lever transmission is eliminated, the number of ampere turns can be correspondingly less, the magnetic fields build up and collapse more quickly, and the time constants are smaller. Moreover, the necessary shaft of the plunger is very short. Apart from reducing the time required for performing the operation of shifting the clutch, further advantages are gained in that the number of parts required in the actuating means of the clutch disc is small, no bulky supplementary structures on the motor casing are needed, and a space which is substantially available is used for accommodating the magnet so that, motor and magnet form a unitary assembly which in bulk does not exceed that of any known clutch motor without a magnetically controlled clutch. This is of particular importance in the instant invention because the space available for the motor in sewing machines is often extremely restricted. Another advantage resides in the fact that the power required of the solenoid is very low.

In order to accommodate the solenoid as compactly as possible, it is preferred to locate the sleeve for axially shifting the clutch disc between the driven shaft and the ring-shaped plunger. It is also preferred that the energised solenoid should urge the clutch disc into frictional contact with the flywheel.

The guiding surfaces for the plunger are conveniently located at the ends of the plunger in the hub portion of the clutch housing.

For shifting the clutch disc into engagement with the brake disc, it is advisable to provide spring means which act on the sleeve in the direction of moving the clutch disc towards the brake disc. The spring means may take the form of an assembly of dished springs interposed between the solenoid plunger and the stationary clutch housing.

The provision of springs for retracting the clutch disc will be rendered unnecessary if, according to yet another feature of the invention, a permanent magnet is built into the clutch disc, said magnet urging the clutch disc into engagement with the brake disc, when the solenoid is not energised. In order to nullify the effect of the permanent magnet, when the solenoid has been energised an auxiliary magnet may be disposed in parallelism with the solenoid.

Other advantages and features of the invention will emerge in the course of the following description of embodiments of the invention by reference to the drawings in which FIGURE 1 is a fragmentary section of a clutch and brake motor comprising an actuating solenoid and a return spring, FIGURE 2 is a fragmentary section of a clutch and brake motor comprising an actuating solenoid and a restoring permanent magnet.

FIGURE 3 is a fragmentary section of a clutch and brake motor comprising an actuating solenoid as well as an auxiliary magnet.

In FIGURE 1, the motor shaft 1 drives a flywheel 2 at a constant speed, the flywheel being mounted on the shaft. A clutch disc 3 is optionally shiftable into frictional contact with flywheel 2 or with an adjustable ring-shaped brake disc 4. Brake disc 4 is built into the stationary clutch housing 5. Clutch disc 3 is axially shiftable but is rotatably fast on a drive shaft 6, so that when the drive shaft is moved axially, the clutch disc movable therewith may be engaged with flywheel 2 so as to drive drive shaft 6 or with brake disc 4 so as to stop the drive shaft. When in frictional contact with flywheel 2, clutch disc 3 transmits torque to a driving pulley 7 secured fast on drive shaft 6.

The winding 8 of a solenoid is built into clutch housing 5. A solenoid plunger 9 in the form of a ring-shaped armature is secured fast on a slidable sleeve 10, which sleeve moves with drive shaft 6, wherefore the plunger moves accordingly.

When winding 8 is energised, plunger 9 shifts in the direction of arrow A. Sleeve 10 participates in this shift in direction A and urges a clutch lining 11 into frictional contact with flywheel 2. Clutch disc 3 is therefore entrained by flywheel 2 and drive shaft 6 together with driving pulley 7 begin to rotate. In other words, clutch disc 3 is moved by winding 8 which, when energized, from a source (not shown), will establish a flux field attracting plunger 9 which in turn will cause sleeve 10, clutch disc 3, and drive shaft 6 to move to the left as viewed in FIG. 1, thereby to engage the clutch.

Interposed between clutch housing 5 and a disc 12 which is rigidly connected to sleeve 10 is a spring assembly of dished springs 13 functioning to retract sleeve 10 when winding 8 is not energised. It therefore urges a friction lining 14 into contact with brake disc 4 for braking clutch disc 3, drive shaft 6 and driving pulley 7. In other words, upon release of energization of winding 8, spring assembly 13 will release the clutch and apply the brake.

The power required for energising winding 8 is low because the shift of plunger 9 is short and the air gap is small.

Drive shaft 6 runs inside of sleeve 10 which preferably is formed of sintered bronze. A retainer member 10' is disposed between the disc 12 and the solenoid plunger 9. Drive shaft 6 together with sleeve 10, retainer member 10', plunger 9 and clutch disc 3, can thus be displaced in and contrary to the direction of arrow A. Guide members 12' and 13' which preferably consist of soft iron are disposed forwardly and upwardly respectively of plunger 9. The guide members are provided with surfaces 15 and 16 which function as guide surfaces when such displacement takes place.

The hub of flywheel 2 contains a variable slip coupling 17. If the solenoid is connected in series with a variable resistor, the latter can be used to vary the torque transmissible by slip coupling 17 which operates as a supplementary clutch. This permits the torque transmitted by flywheel 2 to driving pulley 7 and the speed of rotation of driving pulley 7 to be controllably varied. In other words, slip coupling 17 is in parallel with the clutching between flywheel 2 and clutch lining 11 and is varied in the amount of torque it can transmit by means of winding 8.

In the embodiment illustrated in FIGURE 2, dished springs 13 are eliminated. A sleeve 110 and hence the clutch disc 103 are retracted by a permanent magnet 118. In order to restrict the effect of permanent magnet 118 to the periods during which the solenoid is not energised, the arrangement is such that the polarity of the energised solenoid will repel the permanent magnet.

In order to guide the lines of force of the solenoid through permanent magnet 118, a collar 119 formed of a magnetically non-permeable material such as brass is provided.

In other words, the FIG. 2 embodiment teaches a magnet 118 functioning to apply the brake upon release of the energization of the solenoid.

Alternatively, as shown in the form illustrated in FIG. 3, the effect of a permanent mangnet 218 can be nullified by a supplementary coil 220 connected in parallel with the solenoid winding 208. In other words, the FIG. 3 embodiment teaches a permanent magnet as well as an auxiliary coil employed to nullify the flux generated by the permanent magnet where the coil is energized.

In the embodiments shown in FIGURES 2 and 3, a weak spring 121 or 221, as the case may be, is provided which urges the respective clutch disc 103 or 203 and its friction lining 114 or 214 into contact with the inside wall of clutch housing 105 or 205 immediately the solenoid is deenergised, so that the effect of the permanent magnet will not be attenuated by a wide air gap.

Clutch housing 5, or 105, or 205, as the case may be, is provided with an air opening 30, or 130, or 230 respectively through the wall thereof and flywheel 2, or 102, or 202, as the case may be, is likewise provided with air openings 31, or 131, or 231 respectively wherefor the flywheel may serve as a ventilating fan with air openings communicating with the chamber containing the clutch disc. Clutch disc 3, or 103 or 203, as the case may be, is likewise provided with air openings 32, 132, 232 respectively which permits winding 8, 108, 208 respectively of the solenoid to be cooled by the fanning action of the flywheel.

What we claim is:

1. In a sewing machine driving arrangement having a driving shaft connected to means for the driving thereof, the combination of, a stationary clutch housing, a flywheel concentrically mounted on and rotatable with the driving shaft, a driven shaft, a pulley fixedly mounted upon and rotatable with said driven shaft, a brake disc fixedly mounted upon said clutch housing and concentrically related to said driving shaft, a clutch disc fixedly mounted upon and rotatable with said driven shaft intermediate said flywheel and brake disc being alternately shiftable axially into frictional contact with said flywheel and brake disc, a stationary solenoid including a coil and an axially shiftable plunger concentrically related to and circumscribing said driven shaft, a shiftable sleeve concentrically related to and slidable with said driven shaft, the plunger of said solenoid being fixedly mounted upon said sleeve, return means for actuating said clutch disc toward said brake disc said driven shaft and pulley and clutch disc being arranged for axial shifting unisonly in one direction for frictional contact of said clutch disc with said flywheel as the plunger of said solenoid and said sleeve are shifted upon energization of the coil of said solenoid for the transfer of torque from said clutch disc to said pulley and unisonly in an opposite direction for frictional contact of said clutch disc with said brake disc under the urging of said return means upon deenergization of the coil of said solenoid.

2. In the sewing machine driving arrangement as set forth in claim 1 wherein said return means comprises a spring interposed between the plunger of said solenoid and said clutch housing.

3. In the sewing machine driving arrangement as set forth in claim 1 wherein said return means comprises a permanent magnet mounted upon said clutch.

4. In the sewing machine driving arrangement as set forth in claim 1, including, guide means at each end of the plunger of said solenoid for the guiding thereof.

5. In the sewing machine driving arrangement as set forth in claim 3, including an auxiliary nullifying electromagnet so related to said permanent magnet as to nullify the force of said permanent magnet while said solenoid is energized.

6. In the sewing machine driving arrangement as set forth in claim 1, including, air openings in said flywheel and clutch disc for the cooling of said solenoid.

7. In the sewing machine driving arrangement as set forth in claim 1, including a variable input coupling in the form of a multiple-plate variable slip coupling for transmitting a torque to said driven shaft depending upon the contact pressure between the slip coupling plates.

References Cited by the Examiner
UNITED STATES PATENTS

| | | | |
|---|---|---|---|
| 2,348,025 | 5/1944 | Peets et al. | |
| 2,823,776 | 2/1958 | Pierce | 192—84 |
| 2,843,236 | 7/1958 | Hunt | 192—18 |
| 2,859,845 | 11/1958 | Bachman. | |
| 2,956,658 | 10/1960 | Jaeschke | 192—84 |
| 2,965,203 | 12/1960 | White. | |
| 3,114,340 | 12/1963 | Hedegaard | 112—219 |

DAVID J. WILLIAMOWSKY, *Primary Examiner.*

THOMAS J. HICKEY, *Examiner.*

G. V. LARK, *Assistant Examiner.*